United States Patent
Seo et al.

(10) Patent No.: US 7,484,901 B2
(45) Date of Patent: Feb. 3, 2009

(54) IMAGE SENSOR CAMERA MODULE AND METHOD OF FABRICATING THE SAME

(75) Inventors: Byoung-Rim Seo, Chungcheongnam-do (KR); Jae-Cheon Doh, Chungcheongnam-do (KR); Yung-Cheol Kong, Chungcheongnam-do (KR); Seok-Won Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 424 days.

(21) Appl. No.: 11/177,451

(22) Filed: Jul. 7, 2005

(65) Prior Publication Data

US 2006/0028573 A1 Feb. 9, 2006

(30) Foreign Application Priority Data

Aug. 6, 2004 (KR) .................. 10-2004-0061957

(51) Int. Cl.
  *G03B 17/00* (2006.01)
(52) U.S. Cl. ....................... 396/529; 396/532
(58) Field of Classification Search ........... 396/529, 396/533, 144, 146, 532; 348/335, 340, 373; 359/819, 823
See application file for complete search history.

(56) References Cited

U.S. PATENT DOCUMENTS

| | | | |
|---|---|---|---|
| 4,731,669 A * | 3/1988 | Hayashi et al. | 348/208.7 |
| 7,139,028 B2 * | 11/2006 | Itano et al. | 348/340 |
| 7,196,855 B2 * | 3/2007 | Yamaguchi | 359/785 |
| 2003/0128291 A1 * | 7/2003 | Harazono et al. | 348/374 |
| 2003/0128442 A1 | 7/2003 | Tanaka et al. | 359/819 |

FOREIGN PATENT DOCUMENTS

| | | |
|---|---|---|
| JP | 10-321827 | 12/1998 |
| JP | 2001-358997 | 12/2001 |
| JP | 2002-223378 | 8/2002 |
| JP | 2002-280535 | 9/2002 |
| JP | 2002-374436 | 12/2002 |
| JP | 2004-015427 | 1/2004 |
| JP | 2004-173031 | 6/2004 |

OTHER PUBLICATIONS

English language abstract of the Korean Publication No. 2001-358997, Dec. 26, 2001.
English language abstract of the Korean Publication No. 2002-223378, Aug. 9, 2002.

(Continued)

*Primary Examiner*—Rodney E Fuller
(74) *Attorney, Agent, or Firm*—Marger Johnson & McCollom, P.C.

(57) ABSTRACT

The invention involves an image sensor camera module and a method of fabricating the image sensor camera module. The image sensor camera module uses a single-body type lens holder defined by a hollow cylindrical body having a shoulder protruding radially inwardly from an inner surface thereof. First and second lenses therein are spaced apart by a first spacer and a filter therein is spaced from the second lens by a second spacer. An image sensor is adhered to a lower rim of the body, and the filter is adhered to an upper rim thereof. All optical elements within the lens holder thus are affixed in fixed relative position compatible with a predefined focal length and axis. Moreover, the adhesively sealed interior of the body of the image sensor camera module prevents particulate contamination.

15 Claims, 5 Drawing Sheets

OTHER PUBLICATIONS

English language abstract of the Japanese Publication No. 2002-280535, Sep. 27, 2002.

English language abstract of the Japanese Publication No. 2002-374436, Dec. 26, 2002.

* cited by examiner

IMAGE SENSOR CAMERA MODULE AND METHOD OF FABRICATING THE SAME

BACKGROUND OF THE INVENTION

This application claims the priority of Korean Patent Application No. 2004-61957, filed on Aug. 6, 2004 in the Korean Intellectual Property Office, the disclosure of which is incorporated herein in its entirety by reference.

1. Field of the Invention

The present invention relates to a camera module applied to a mobile phone or a digital camera, and more particularly, to a lens holder structure of an image sensor camera module and a method of fabricating the same.

2. Description of the Related Art

Use of digital cameras is increasing along with internet video communication and the like. Also, with the increasing popularity of next generation mobile communication, compact camera modules are increasingly required to use compact personal digital assistants (PDAs) in video communication or the like. In other words, there is a greatly increasing demand for subminiature camera modules directly and indirectly related to high- and multi-function digital cameras.

In particular, cameras adapted in mobile phones used for mobile communication employ compact camera modules.

FIG. 1 illustrates a conventional image sensor camera module. Referring to FIG. 1, a barrel 30 in which a lens 80 is mounted is attached to a lens holder 20. The barrel 30 is inserted into the lens holder 20 using a matching threading of the lens holder 20 and the barrel 30. By rotating the threaded barrel 30 within the threaded lens holder 20, a distance between the lens 80 and an image sensor 70 attached on a circuit board 10 is adjustable. This distance is then used to adjust the focus of the lens 80. However, in a case where an axis 60 of the lens 80 does not coincide with a central axis 50 of the image sensor 70, an image with a high resolution cannot be obtained via the lens 80, and the phase of the image is also not clear. Thus, the barrel 30 is necessarily adjusted to allow the axis 60 of the lens 80 to coincide with the central axis 50 of the image sensor 70, i.e., a length distance between the lens 80 and the image sensor 70 is necessarily adjusted.

In other words, the conventional image sensor camera module is completed by separately assembling the lens holder 20 into which the barrel 30 is inserted, and the image sensor 70 is attached on the circuit board 10. Both the accuracy and reliability of the conventional image sensor camera module are poor because the axis 60 of the lens 80 will often not coincide with the central axis 50 of the image sensor 70. Another shortcoming of the conventional image sensor camera module is that the barrel and lens holder threads may cause particles to be generated during a rotation of the barrel 30. The particles may contaminate the image sensor 70, which may affect the operation of the image sensor 70.

SUMMARY OF THE INVENTION

The present invention provides an image sensor camera module which can be assembled without adjusting a focal length between a lens and an image sensor.

In one aspect, an image sensor camera module comprising: a lens holder defined by a single generally cylindrical body having an opening extending axially therethrough; a first lens installed inside the lens holder; an image sensor comprising an upper surface directly adhered to an inner surface of the cylindrical body; and a circuit board electrically coupled to terminals of the image sensor.

In another aspect, the present invention also provides a method of fabricating an image sensor camera module by which a process of assembling the image sensor camera module can be simplified, and a contamination of the image sensor camera module due to particles can be prevented.

According to an embodiment of the present invention, there is provided an image sensor camera module including: a lens holder; a lens installed inside the lens holder; an image sensor including an upper surface directly adhered to an inner surface of the lens holder; and a circuit board electrically coupled to terminals of the image sensor.

According to another embodiment of the present invention, there is provided an image sensor camera module including: a single body type lens holder into which first and second lenses are inserted to be spaced apart from each other via a spacer; a filter adhered to an inner surface of the lens holder above the second lens to be exposed to the outside of the lens holder; an image sensor including an upper surface, the upper surface being adhered to the inner surface of the lens holder under the first lens; and a circuit board electrically coupled to terminals of the image sensor under the lens holder.

According to still another embodiment of the present invention, there is provided a method of fabricating an image sensor camera module, including: providing a single body type lens holder; inserting a lens on a protrusion formed inside the lens holder; inserting a spacer on the lens; inserting a filter into an end of the lens holder; and adhering an image sensor to a lower surface of the protrusion; and electrically coupling terminals of the image sensor to a circuit board.

According to yet another embodiment of the present invention, there is provided a method of fabricating an image sensor camera module, including: providing a single body type lens holder into which first and second lenses are inserted to be spaced apart from each other via a spacer and to which a filter is adhered on the second lens to be exposed to the outside of the lens holder; adhering an upper surface of an image sensor to an inner surface of the lens holder under the first lens; electrically coupling terminals of the image sensor to a circuit board under the lens holder; and filling a filling adhesive between the image sensor and the circuit board.

BRIEF DESCRIPTION OF THE DRAWINGS

The above and other features and advantages of the invention will become more apparent by describing in detail exemplary embodiments thereof with reference to the attached drawings.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 2:
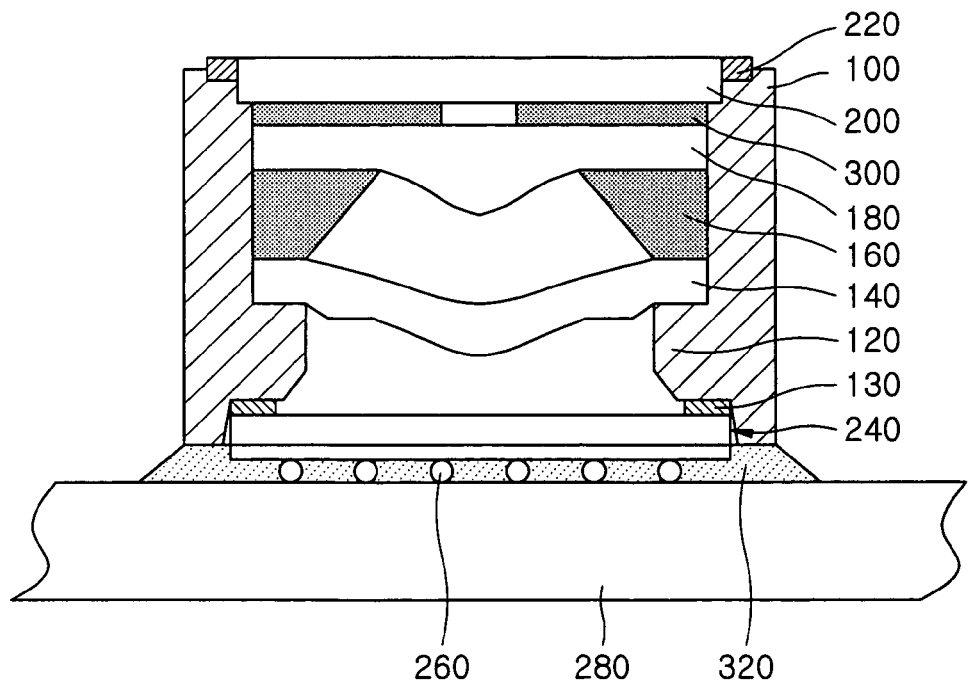
FIG. 2 is a cross-sectional view of an image sensor camera module, according to one embodiment of the invention.

FIG. 2 is a cross-sectional view of an image sensor camera module, according to an embodiment of the present invention. Referring to FIG. 2, a first lens 140 is inserted on (or placed flush against) an inner protrusion or shoulder 120 of a single body type lens holder 100. Those of skill in the art will appreciate that shoulder 120 represents a generally planar substantially contiguous peripheral inward protrusion that, because of the uniform dimensions of the holder and the shoulder integrally formed therewith supports the first lens 140 and an image sensor 240 in a fixedly predetermined position defining a fixed focal length or distance and a fixed focal axial alignment. It will also be appreciated that the preferably integrally molded holder and shoulder properly fixedly align an optional second lens and an optional filter in identical, fixed focal axial alignment and focal length.

Thus, in accordance with one embodiment of the invention, a second lens 180 is inserted above the first lens to be spaced apart from the first lens 140 via a first spacer 160. The inner protrusion or shoulder 120 is formed to extend circularly, circumferentially around an inner surface of the lens holder 100 to support the first lens 140. Also in accordance with one embodiment of the invention, a filter 200 is mounted above the second lens 180 to be adhered to the inner surface of the lens holder 100 to be exposed to the outside. Here, the filter 200 is preferably adhered to the inner surface of the lens holder 100 (at an upper extreme end thereof referred to herein as a rim) using an adhesive 220 to seal the interior of the lens holder 100 against particulate contaminants. As shown in FIG. 2, a second spacer 300 may be further included to maintain a desired distance between the second lens 180 and the filter 200.

The lens holder 100 can be made of a material intercepting radio waves such as a plastic material or a metallic material, and the first and second lenses 140 and 180 and the filter 200 may be made of any suitable glass, plastic or other optical quality material.

An upper surface (a surface opposite the surface that includes the connection terminals) of an image sensor 240 is directly adhered to the inner surface of the lens holder 100 under the first lens 140. The image sensor 240 may be adhered to an underside of the shoulder 120 using an adhesive 130 as shown in FIG. 2. The image sensor 240 is also electrically coupled to a circuit board 280 under the lens holder 100. A filling adhesive 320 is filled between the lens holder 100 and the circuit board 280 to which the image sensor 240 is adhered. The image sensor 240 will be understood to be an image sensor in which an image sensor chip is mounted on a board. A passivation layer (not shown) such as silicon nitride, polyimide, or glass may be formed on part of or the entire surface of the image sensor chip.

Here, the image sensor 240 may be a suitable Charge Coupled Device (CCD) or a Complementary Metal-Oxide-Semiconductor (CMOS) image sensor. The image sensor 240 may be packaged in the form of a chip scale package, for example, ball grid array (BGA), or quad flat nonlead (QFN), to make the image sensor module compact. In FIG. 2, the image sensor 240 includes terminals 260 that protrude from the lower opposite surface of the image sensor 240 as in the case of a BGA. However, in the case of the QFN, the terminals 260 do not protrude outside the image sensor 240. Instead, portions of the image sensor 240 itself are exposed to the exterior of the sensor and perform the electrical interconnect function of the terminals 260.

As described above, in the image sensor camera module according to the present invention, the single-body type lens holder 100, in which the first and second lenses 140 and 180 are spaced apart from each other via the first spacer 160, is adhered to the image sensor 240. Thus, when the image sensor camera module is assembled, a focal length between the first and second lenses 140 and 180 and the image sensor 240 does not need to be adjusted as in the prior art. As a result, a process of assembling the image sensor camera module can be greatly simplified, and the accuracy and reliability of the image sensor camera module can be greatly improved. Also, since the lens holder 100 is directly adhered to the image sensor 240, the probability of error or inaccuracy in fabricating the image sensor camera module is low when compared to that of the conventional image sensor camera module.

Figure 3:
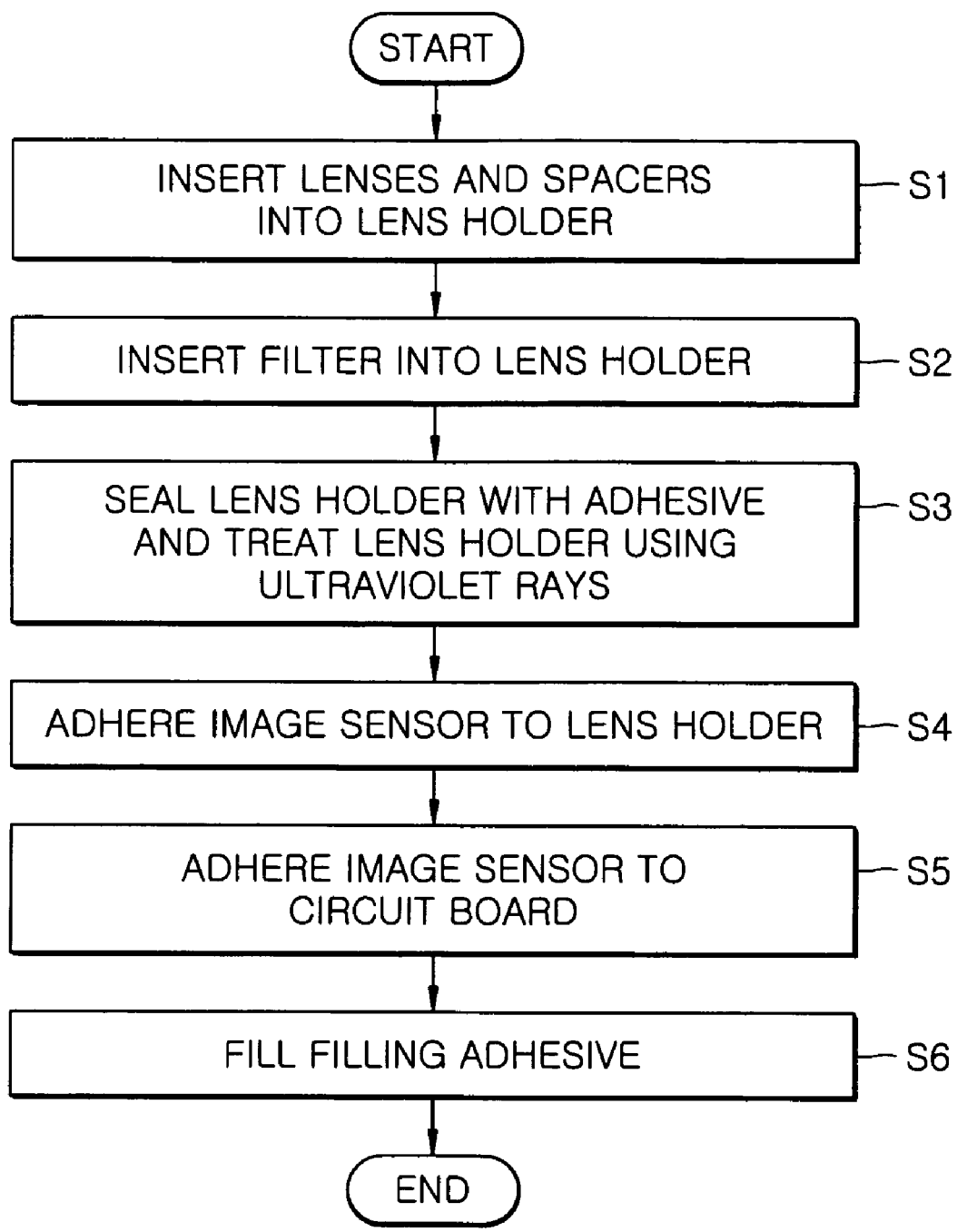
FIG. 3 is a flowchart of a method of fabricating the image sensor camera module of the present invention.

FIG. 3 is a flowchart of a method of fabricating the image sensor camera module of the present invention. FIGS. 4 through 9 are cross-sectional views illustrating the method of fabricating the image sensor camera module of the present invention.

The method of fabricating the image sensor camera module of the present invention will now be described in detail with reference to FIGS. 3 through 9.

Figure 4:
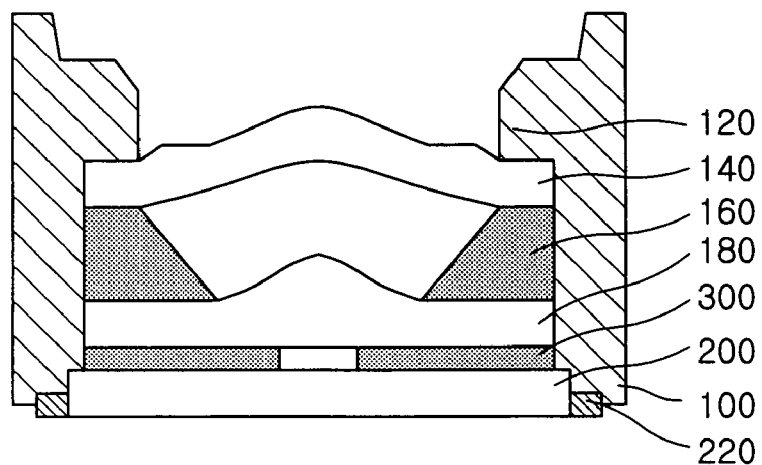
FIGS. 4 through 9 are cross-sectional views illustrating a method of fabricating the image sensor camera module of the one embodiment of the invention.

As shown in FIG. 4, in operation S1, the first lens 140, the first spacer 160, the second lens 180, and the second spacer 300 are inserted into the single body type lens holder 100. In operation S2, the filter 200 is inserted into the lens holder 100. In operation S3, the interior of the lens holder 100 is sealed with the adhesive 220 and then treated using ultraviolet (UV) radiation. The completed lens holder 100 is turned upside down as shown in FIG. 4.

The lens holder 100 includes the shoulder 120 extending in a circle around the inner surface thereof. The first lens 140 is inserted and placed flush against the shoulder 120 so that the shoulder 120 supports the first lens 140. The first spacer 160 is inserted and placed flush against the first lens 140, and then the second lens 180 is inserted and placed flush against the first spacer 160. Next, the second spacer 300 is inserted and placed flush against the second lens 180. Next, the filter 200, e.g., an infrared (IR) or ultraviolet (UV) or other desired camera-quality filter, is inserted on the second spacer 300. Thereafter, the adhesive 220 is inserted between an end or rim of the inner surface of the lens holder 100 and the filter 200 so that the filter 200 is adhered to the rim of the inner surface of the lens holder 100 and so that an outer surface of the filter 200 is exposed.

The first spacer 160 is inserted so that the first lens 140 is spaced apart from the second lens 180, and the second spacer 300 is inserted so that the second lens 180 is spaced apart from the filter 200. Thus, the first and second spacers 160 and 300 must be designed to obtain an optimum resolution in consideration of the focal length of the first and second lenses 140 and 180 and an image sensor that will be adhered in a subsequent process. An adhesive, e.g., a UV adhesive, is preferably coated on a surface of the shoulder 120 inside the lens holder 100 to securely adhere the first lens 140 to the shoulder 120. If necessary, an O-ring made of a rubber material may be inserted on a surface of the first lens 140 opposite the shoulder 120. The first spacer 160 is preferably a singular, hollow, cylindrical structure or it can be a spacer made of several pieces. The filter 200 filters UV light irradiated from the outside, and the side of the filter 200 is sealed with the adhesive 220 to adhere the filter 200 to the lens holder 100. The adhesive 220 preferably contains an ingredient that hardens, i.e. is activated, by UV radiation.

Figure 5:
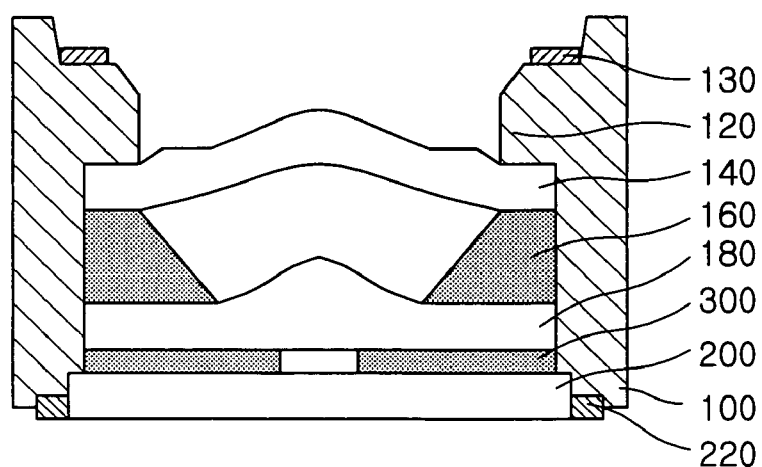
Figure 6:
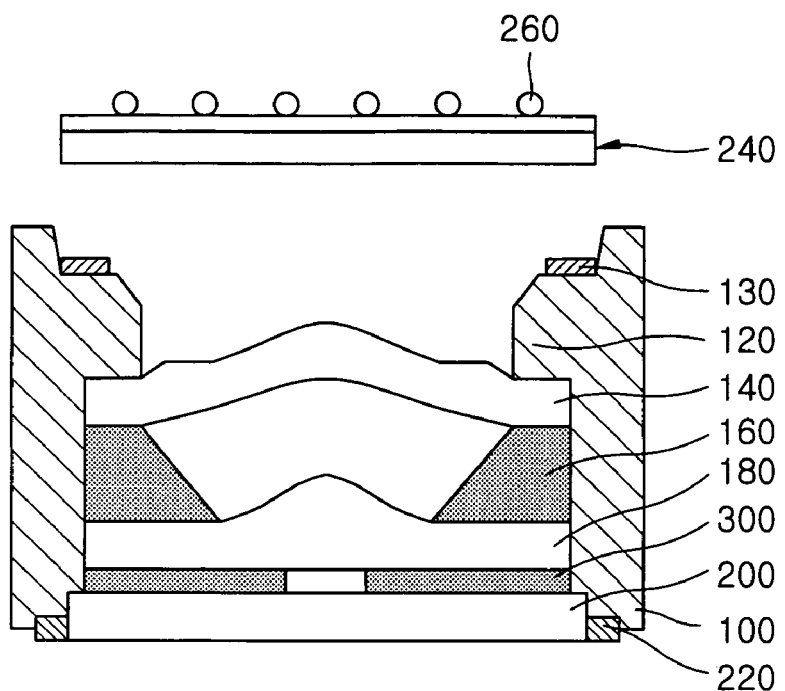
Figure 7:
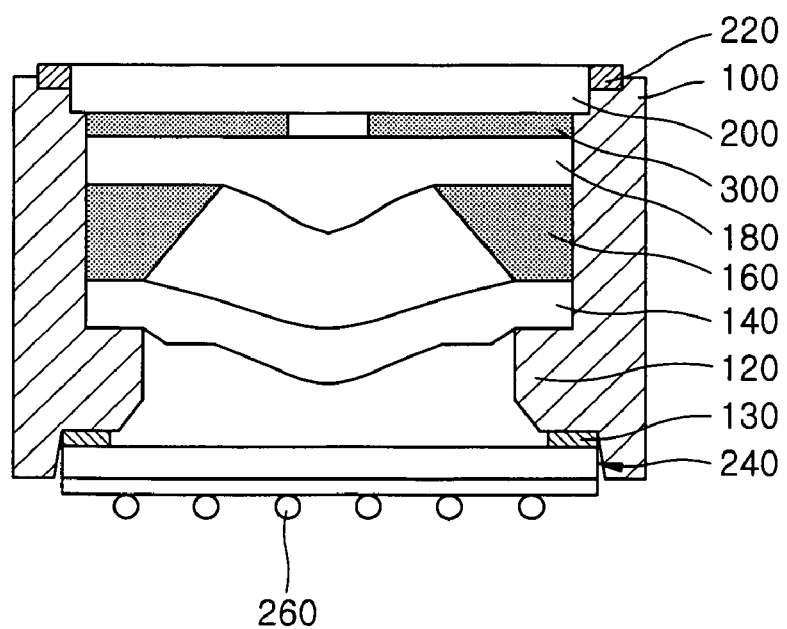

In operation S4, the image sensor 240 is adhered to the lens holder 100. As shown in FIG. 5, for the adhesion of the image sensor 240 to the lens holder 100, an adhesive 130 is coated on a horizontal second shoulder region of the inner surface 120 of the lens holder 100. Referring to FIG. 6, a surface of the image sensor 240 opposite that which includes the terminals 260 is adhered on the adhesive 130. As shown in FIG. 7, the resultant structure includes the image sensor 240 adhered to the lens holder 100.

Figure 1:
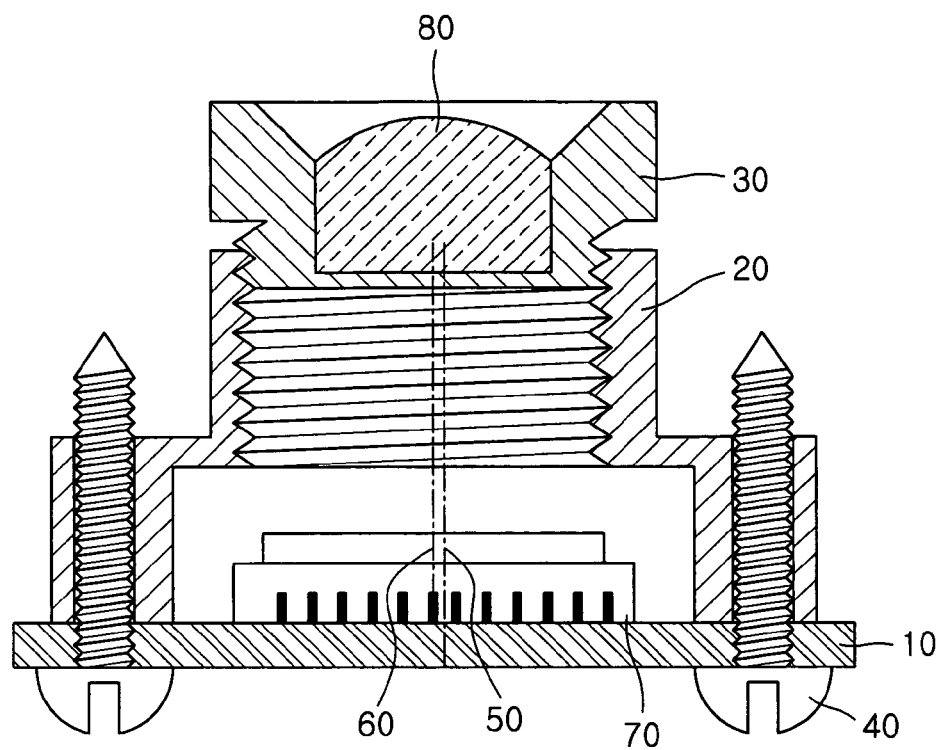
FIG. 1 is a cross-sectional view of a conventional image sensor camera module.

The adhesive 130 is any suitable adhesive and preferably is a thermosetting adhesive that is used at a temperature between approximately 100° C. and 150° C. Because the image sensor 240 is directly adhered to the lens holder 100, an image sensor camera module compatible focal lengths of the first and second lenses 140 and 180 and the image sensor 240 is possible. In this process, the adhesive 130 can contribute to reducing any error between the focal lengths of the first and second lenses 140 and 180 and the image sensor 240 to less than 20 micrometers. Thus, a resolution of the image sensor camera module can be preserved. In addition, when an adhering process is performed after the entire upper surface of the image sensor 240 is passivated by the passivation layer (not shown), contamination of the image sensor camera module, for example, by airborne particles (or by particles inadvertently, frictionally produced while screwing a prior art lens holder into a prior art threaded barrel—see FIG. 1) is further reduced.

Figure 8:
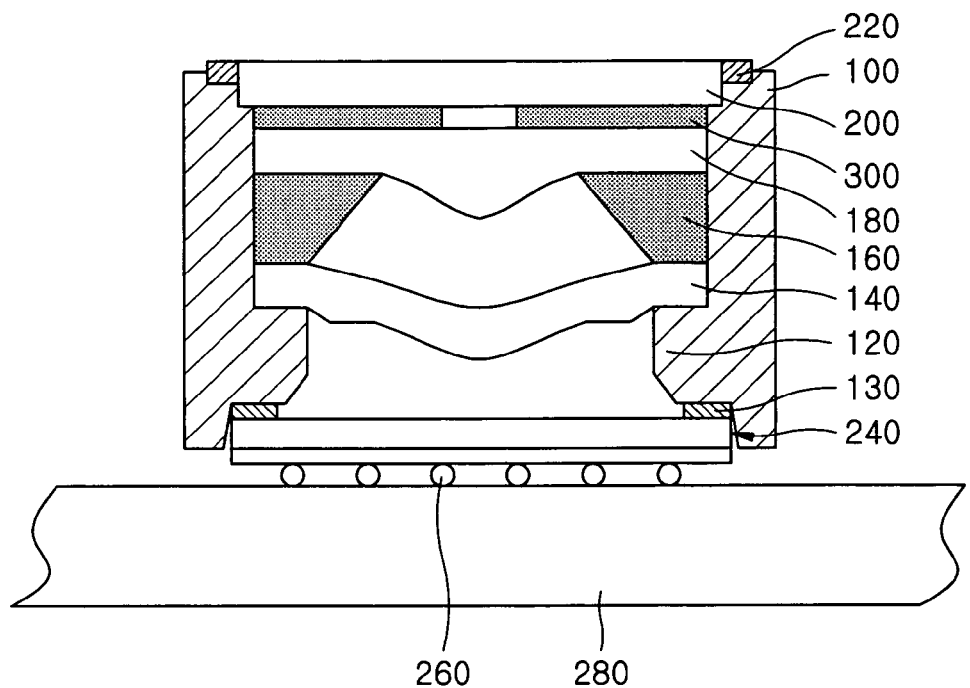

In operation S5, the image sensor 240 is adhered to the circuit board 280. Referring to FIG. 8, the image sensor 240 is adhered to the lens holder 100 and also is electrically connected and adhered to the circuit board 280 via the terminals 260. The terminals 260 of the image sensor 240, e.g., solder balls, are electrically coupled to a corresponding circuit pad (not shown) representing electric signals of the circuit board 280, as will be understood by those of skill in the art.

Figure 9:
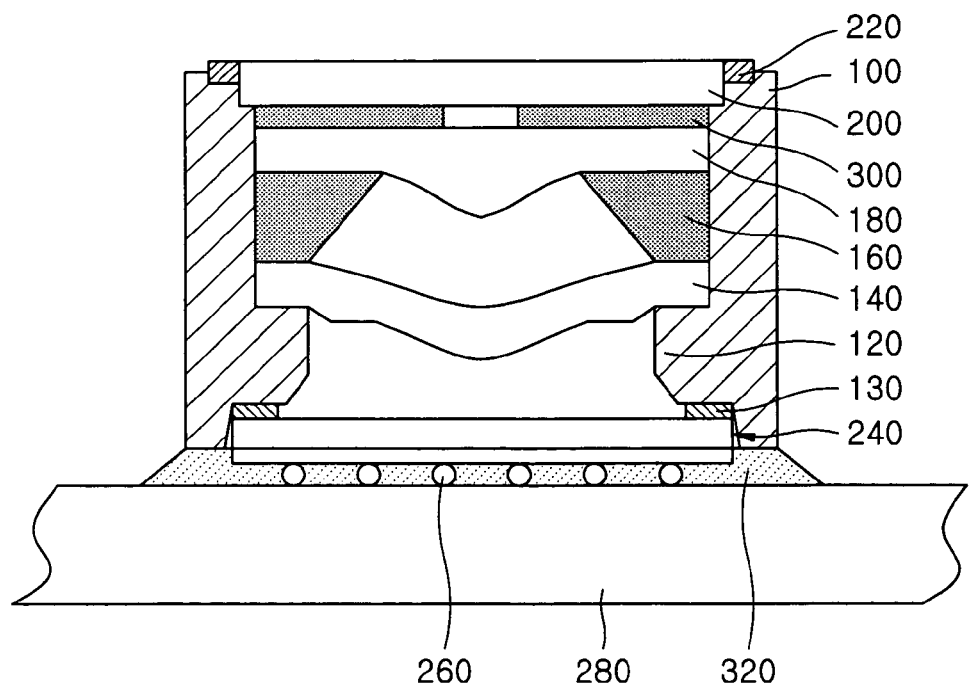

Referring to FIG. 9, in operation S6, the filling adhesive 320 is filled between the circuit board 280 and the image sensor 240. The filling adhesive 320 strengthens the adhesion of the lens holder 100 to the circuit board 280 and prevents impurities from permeating between the lens holder 100 and the circuit board 280. Those of skill in the art will appreciate that the filling adhesive 320 can, for example, be a thermosetting adhesive that is capable of readily being hardened, e.g., the application of heat or UV radiation.

Although not shown, in a subsequent process, the circuit board 280 adhered to the lens holder 100 may be separated from other such image sensor modules (e.g., a regular, plural array of such modules) using a sawing or routing or machining or laser process to singularize or individuate each image sensor camera module. Alternatively, a single circuit board 280 may be adhered to a single lens holder 100 to obviate the separation process described above. However, it is preferable that a plurality of lens holders be adhered to a single circuit board having a corresponding regular array of individual or group camera module circuit patterns. Then the circuit board can be readily separated or divided into sections, each section having one or more lens holders.

As described above, according to embodiments of the present invention, there is provided the lens holder 100 in which the first and second lenses 140 and 180 are inserted and spaced apart from each other via the first spacer 160, and the filter 200 is adhered to the inner surface of the lens holder 100 above the second lens 180 to be exposed to the outside of the lens holder 100. Next, the upper surface of the image sensor 240 is adhered to the inner surface of the lens holder 100 under the first lens 140. As a result, a process of fabricating the image sensor camera module can be simplified and rendered more accurate and repeatable. Further, particulate contamination of the image sensor camera module can be prevented.

An image sensor camera module according to embodiments of the present invention can use a single-body type lens holder. Thus, the costly process of adjusting focal lengths of the image sensor and its respective one or more lenses can be omitted. Also, the distance between the lenses and the image sensor can be rendered more uniform. As a result, the highest accuracy and resolution of the image sensor camera module can be maintained.

Also, a method of fabricating the image sensor camera module according to embodiments of the present invention results in a greatly simplified process of assembling the image sensor camera module. As the single-body type lens holder is directly adhered to the image sensor, any undesirable change of focal lengths of the lenses and the image sensor can be minimized. Also, any error in fabricating the image sensor camera module can be minimized or avoided altogether. Finally, the image sensor camera module can prevent particles from permeating the sealed body and its adhered contents.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image sensor camera module comprising:
 a lens holder defined by a single generally cylindrical body having an opening extending axially therethrough;
 a first lens installed inside the lens holder;
 a second lens disposed in the lens holder;
 a spacer disposed in the lens holder;
 an image sensor comprising an upper surface directly adhered to an inner surface of the cylindrical body; and
 a circuit board electrically coupled to terminals of the image sensor;
 wherein:
  a thickness of the spacer aligns the first lens and the second lens to focus an image on the image sensor;
  the terminals of the image sensor are disposed on a first surface of the image sensor; and
  a second surface of the image sensor that is opposite to the first surface is adhered to the inner surface of the cylindrical body.

2. The image sensor camera module of claim 1, wherein the inner surface of the lens holder includes a generally planar substantially contiguous peripheral inward protrusion to support the first lens.

3. The image sensor camera module of claim 1, wherein a filling adhesive is filled between the body of the lens holder and the circuit board.

4. The image sensor camera module of claim 1, wherein the second lens is spaced apart from and above the first lens via the spacer.

5. The image sensor camera module of claim 4, further comprising a filter placed above the second lens.

6. The image sensor camera module of claim 5, wherein the lens holder, the first lens, the image sensor, the circuit board, the second lens and the filter are all affixed in a predefined fixed positional relationship to one another that defines an aligned and fixed-distance focal length at least as among the first and second lens and the image sensor.

7. The image sensor camera module of claim 1, wherein the spacer is disposed in the lens holder to isolate the first lens from the second lens.

8. The image sensor camera module of claim 1, wherein the lens holder and the circuit board are separated by a filling adhesive.

9. An image sensor camera module comprising:
- a lens holder defined by a hollow cylindrical body with an axial opening therethrough into which first and second lenses are inserted in spaced-apart relationship from each other;
- a filter adhered to an inner surface of a first rim of the lens holder above the second lens to expose an outer surface of the filter;
- an image sensor including an upper surface, the upper surface being adhered to the inner surface of the lens holder under the first lens; and
- a circuit board electrically coupled to terminals of the image sensor adjacent a second opposite rim of the lens holder;
- wherein a filling adhesive is filled between the lens holder and the circuit board.

10. The image sensor camera module of claim 9, wherein the body of the lens holder includes a generally planar substantially contiguous peripheral inward protrusion to support the first lens.

11. The image sensor camera module of claim 10, wherein the image sensor is adhered adjacent the second rim of the body of the lens holder to a lower surface of the protrusion using an adhesive.

12. The image sensor camera module of claim 9, wherein the filter is adhered to the inner surface of the body of the lens holder adjacent the first rim thereof to seal an interior of the lens holder.

13. An image sensor camera module comprising:
- a lens holder defined by a single generally cylindrical body having an opening extending axially therethrough;
- a first lens installed inside the lens holder;
- a second lens disposed in the lens holder;
- a spacer disposed in the lens holder;
- an image sensor comprising an upper surface directly adhered to an inner surface of the cylindrical body; and
- a circuit board electrically coupled to terminals of the image sensor;
- wherein a thickness of the spacer aligns the first lens and the second lens to focus an image on the image sensor and a filling adhesive is filled between the body of the lens holder and the circuit board.

14. An image sensor camera module comprising:
- a lens holder defined by a single generally cylindrical body having an opening extending axially therethrough;
- a first lens installed inside the lens holder;
- a second lens disposed in the lens holder;
- a spacer disposed in the lens holder;
- an image sensor comprising an upper surface directly adhered to an inner surface of the cylindrical body; and
- a circuit board electrically coupled to terminals of the image sensor;
- wherein a thickness of the spacer aligns the first lens and the second lens to focus an image on the image sensor and the lens holder and the circuit board are separated by a filling adhesive.

15. An image sensor camera module comprising:
- a lens holder defined by a hollow cylindrical body with an axial opening therethrough into which first and second lenses are inserted in spaced-apart relationship from each other;
- a filter adhered to an inner surface of a first rim of the lens holder above the second lens to expose an outer surface of the filter;
- an image sensor including an upper surface, the upper surface being adhered to the inner surface of the lens holder under the first lens; and
- a circuit board electrically coupled to terminals of the image sensor adjacent a second opposite rim of the lens holder,
- wherein:
  - the terminals of the image sensor are disposed on a first surface of the image sensor; and
  - a second surface of the image sensor that is opposite to the first surface is adhered to the inner surface of the cylindrical body.

* * * * *